Nov. 16, 1948.　　　　J. R. BURNS　　　　2,454,135
BINDING IMPLEMENT
Filed April 5, 1946　　　　　　　　　　5 Sheets-Sheet 3
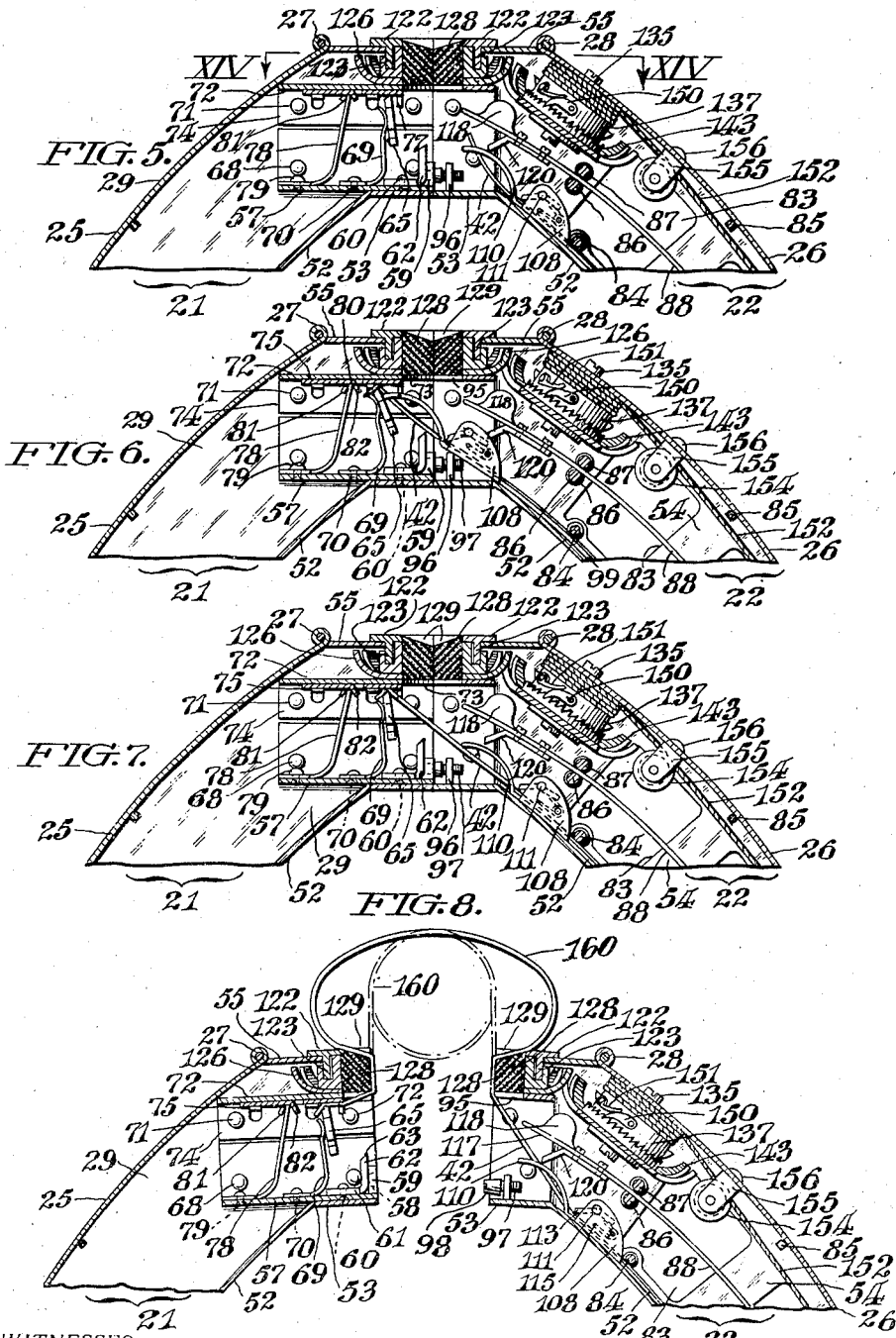

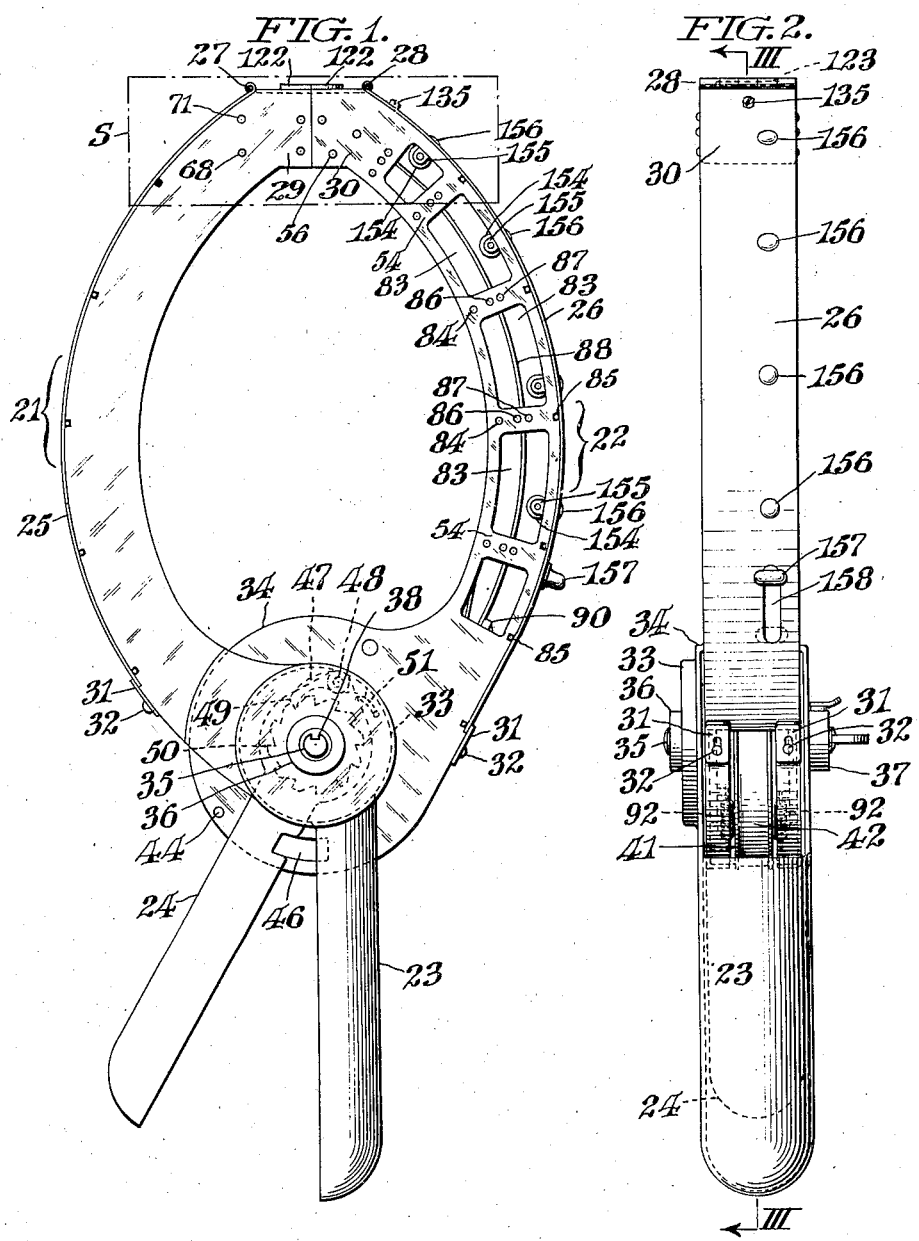

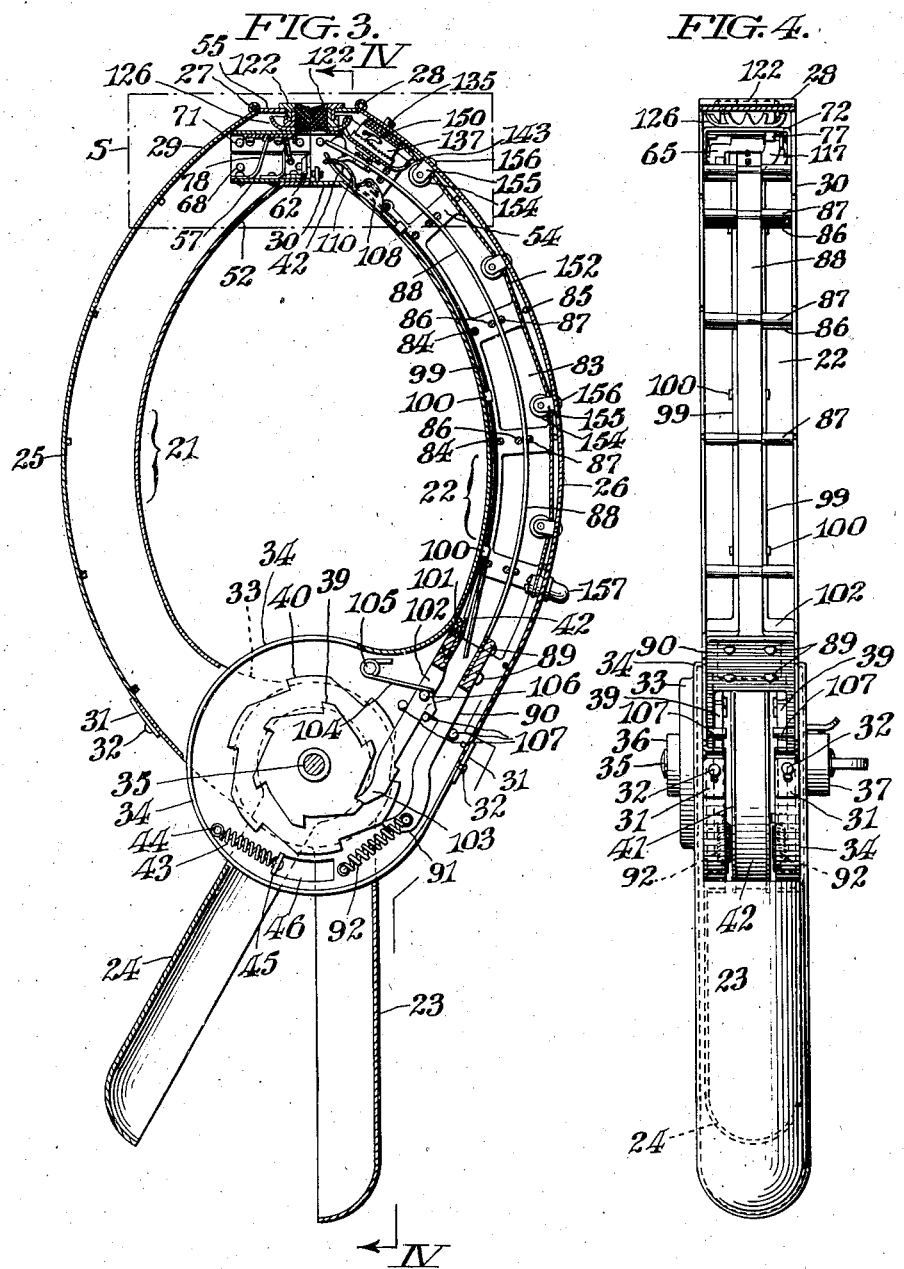

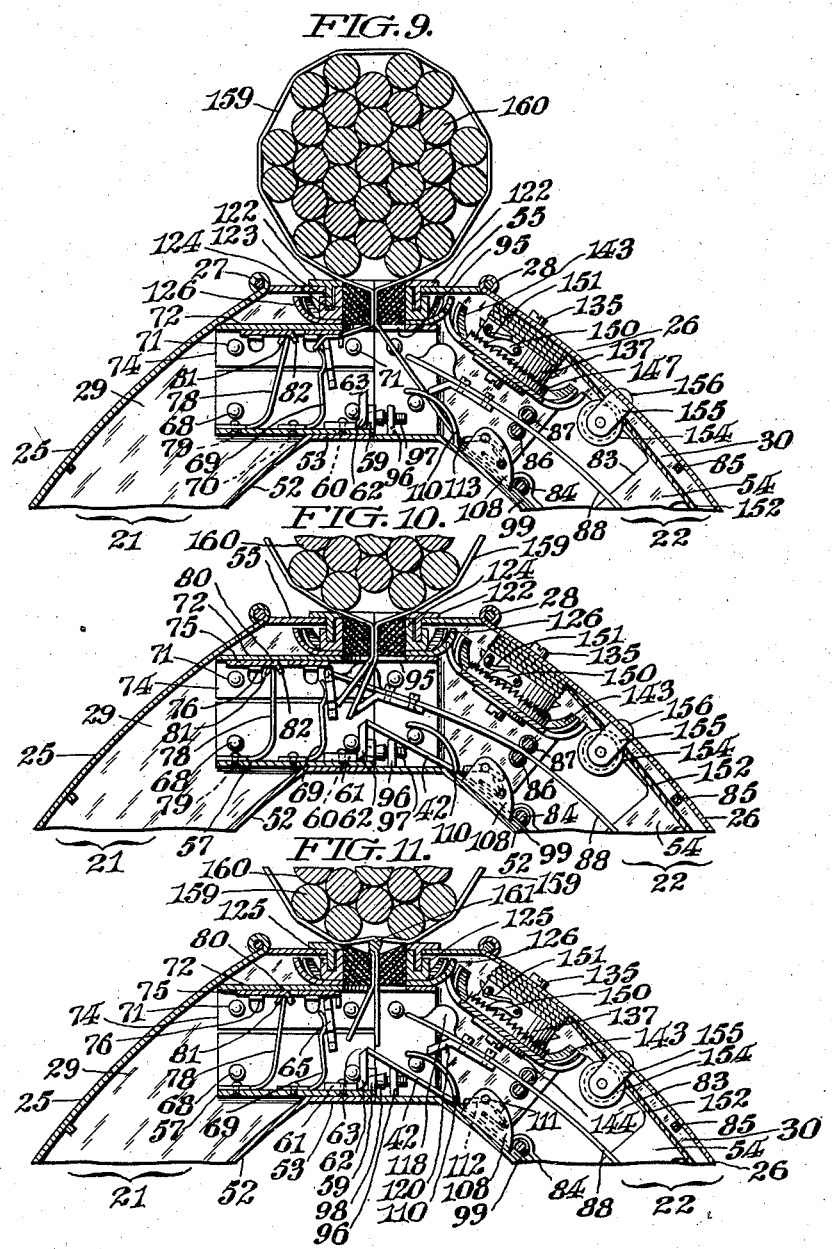

Nov. 16, 1948. J. R. BURNS 2,454,135
BINDING IMPLEMENT
Filed April 5, 1946 5 Sheets-Sheet 5
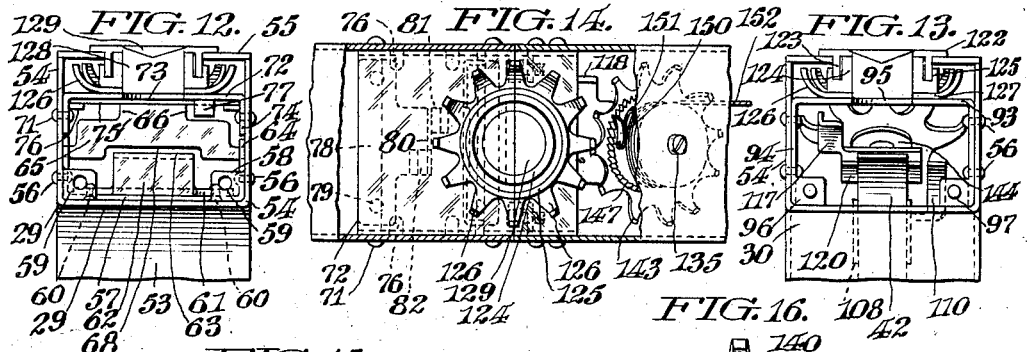
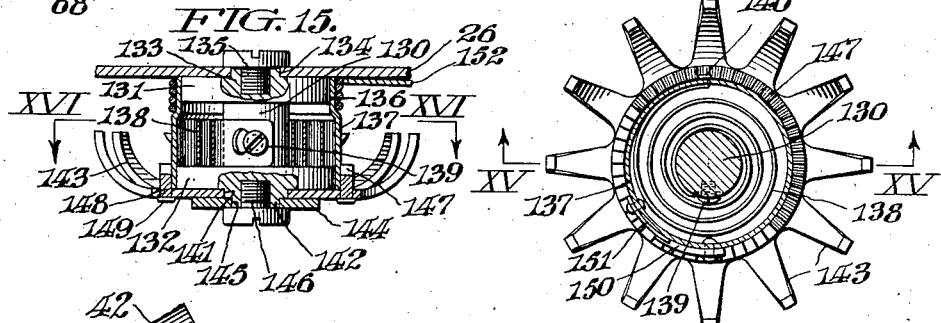
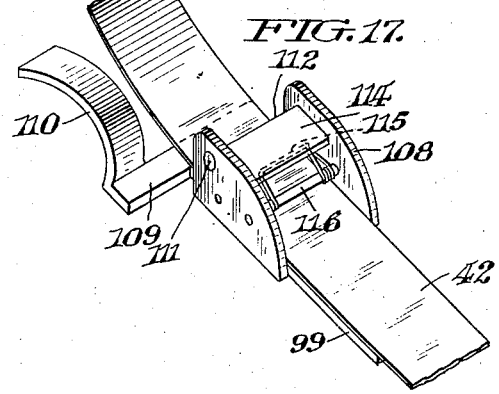
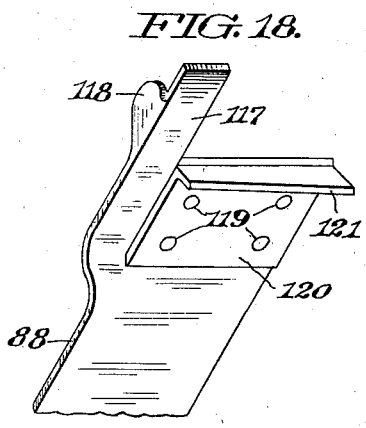
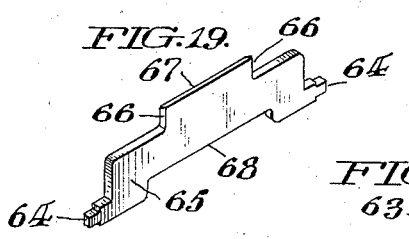
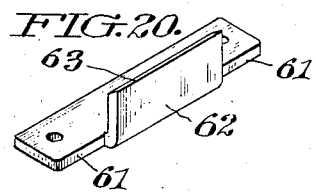
WITNESSES
Thomas W. Kerr, Jr.
Hubert Fuchs
INVENTOR:
Joseph R. Burns,
BY Paul & Paul
ATTORNEYS.

Patented Nov. 16, 1948

2,454,135

UNITED STATES PATENT OFFICE 2,454,135

BINDING IMPLEMENT

Joseph R. Burns, Millbourne, Pa.; Thomas A. Foulke executor of said Joseph R. Burns, deceased Application April 5, 1946, Serial No. 659,980

19 Claims. (Cl. 100—31)

This invention in its broader aspects relates to implements useful for the securing of binding medium about articles, packages, bundles, bandages and so forth, and more particularly to the species using flexible strip as such medium with associated means operative, when the ends of said medium are brought together around the article, bundle or the like, to clinch or otherwise bond said ends against separation.

More specifically the present invention has reference to binding devices of the type disclosed in my prior Patent No. 2,358,622, Granted September 19, 1944, and wherein the confronting ends of the binder medium are constricted and bound together by an applied element secured around and made fast to such constriction.

The primary object of the present invention is to provide an improved device or implement, of the above mentioned species, embodying novel features whereby the confronting ends of the binder medium are "twist-locked" together in a simple and positive manner.

Another object is to provide an implement of the indicated type embodying refinements whereby the binding operation, as a whole, is effected in a more expeditious manner by aid of progressively actuated mechanisms, and quick adjustment may be made to accommodate different thicknesses of the binder medium.

A further object is to provide a binding implement, conveniently although not essentially, of "plier-like" formation, effective to make single or multiple twist-locks in the abutting ends of the binder medium with a minimum expenditure of time and physical effort.

While the foregoing definitions are indicative, in a general way, of the aims of this invention, other objects with ancillary advantages will be evident to those skilled in the art upon a full understanding of the construction, arrangement and operation of the means hereinafter fully disclosed, but it will also be appreciated that the invention is susceptible of other embodiments or structurally modified forms coming equally well within the terms and scope of the concluding claims.

The invention, accordingly, may be briefly defined as consisting in the novel features of construction and parts, combinations and arrangements of cooperative elements, which are typically exemplified by the practical embodiment illustrated in the accompanying five sheets of drawings and hereinafter fully described.

In the drawings:

Fig. 1 is a face view of a binding device or implement embodying the present improvements, said device being shown in the closed or inoperative position.

Fig. 2 is a side view of the same as seen looking from the right towards the left-hand of Fig 1.

Fig. 3 is a sectional view taken approximately on the plane of the angled arrows III—III in Fig. 2.

Fig. 4 is a side elevation taken along the broken line and arrow indications IV—IV at the right-hand side of Fig. 3; or with a hinged casing component removed to better disclose certain mechanism hereinafter fully explained.

Fig. 5 is a vertical section taken approximately within the confines of dot-and-dash line rectangle s in Figs. 1 and 3; but drawn to larger scale for clearer illustration of the novel mechanical parts therein contained.

Fig 6 is a similar sectional view to the preceeding figure but showing the ribbon band or binder medium as initially advanced through the one hollow component or curved jaw of the implement into position for deflection of its free end over a gripper means in the confronting end of the opposing hollow jaw.

Fig. 7 is a corresponding view showing how the free end of the binder medium is firmly gripped preparatory to opening of the implement jaws for withdrawal of a desirable length of the binder medium to encircle the package, bundle or the like to be bound thereby.

Fig. 8 is a similar sectional view with the jaws open and the binder medium drawn out ready for passage of the package, bundle or the like between the confronting jaw ends into the loop formed by the withdrawn binder medium.

Fig. 9 is a sectional view similar to the preceding figure with the jaws closed and the binder medium drawn about a bundle and with the cutter mechanism in position ready to effect severance of said binder from the supply thereof.

Fig. 10 is a similar sectional view to the preceding figure, after the severing operation has been effected, with a portion of the bundle removed in order to compact the view.

Fig 11 is a corresponding view to Fig. 10 with the severing means retracted, and the twist-locking of the confronting ends of the binder medium effected.

Fig 12 is an elevation of the head-portion of the left-hand jaw as viewed in Fig. 5.

Fig. 13 is a corresponding elevation of the head portion of the right-hand jaw as viewed in Fig. 5.

Fig. 14 is a plan section taken approximately as indicated by the angled arrows XIV—XIV in Fig. 5.

Fig. 15 is a detail section taken substantially on the plane XV—XV of Fig. 16.

Fig. 16 is a section taken on the plane indicated by the angled arrows XVI—XVI in Fig. 15.

Fig. 17 is a fragmentary perspective view of the head end of the binder medium feeding means.

Fig. 18 is a similar perspective view of the forward end of the binder medium severing device; while Figs. 19 and 20 are detail views hereinafter specifically explained.

In describing the form of this invention typified in the drawings herewith, specific terms will be employed for the sake of clarity, but it is to be understood the scope of said invention is not thereby limited; each such term being intended to embrace all equivalents which perform the same function for an analogous purpose.

For exemplification only, the embodiment of this invention illustrated will be explained in its capacity as a package or bundle binding implement; while the term "single" is intended to refer to individual articles, parts and limbs of animate bodies, as well as inanimate objects and things. Similarly wherever the term "collective," or its equivalents, occurs it refers to multiple articles and so forth, packed together in bundles, stacked or otherwise arranged for unit bonding or tying-up.

Referring now, more in detail, to the drawings, and first to Figs. 1–4, it is to be remarked that the package or bundle binding implement therein illustrated somewhat conforms with the device shown in Patent #2,358,622 hereinbefore mentioned. Accordingly, I will initially outline the general structure and thereafter fully describe the differentiating features and novel subject matter of the instant invention.

The plier-like form of implement shown comprises opposing arcuate hollow jaws comprehensively designated 21 and 22, the former 21 including a grasp extension 23 and it is hereinafter distinguished as "stationary"; whereas the jaw 22 is pivotal or "movable" by an independently-actuated lever or finger grip 24. The jaws 21, 22 are preferably, although not essentially, of rectangular cross-section and respectively fitted with outwardly swingable cover members 25, 26 hinged at 27, 28 to the head portions 29, 30; while each said cover member is normally held in closed position by a slidable catch 31 and associated button stop 32, as readily understood by those conversant with the art.

The jaws 21, 22 embody opposed tangentially-related cupped sections 33, 34 and they are interpivoted by an axis-pin or arbor 35, afforded support in appropriate bearings 36, 37 and whereto the independent finger-grip 24 is made fast at 38, Fig. 1, in an obvious manner. Housed in the respective cup-sections 33, 34 are relatively stepped ratchets 39, 40, Fig. 3. Intervening the ratchets 39, 40 is a supply-reel 41 of binder, such as a narrow tape-like medium or flat wire strip 42. The pivotally-supported independently movable finger grip 24 is outwardly-influenced by a recoil spring 43 anchored at one end to a fixed stud 44, and having attachment at the other end to an inwardly-directed lug 45, from said finger grip 24, engaged through a movement limiting arcuate slot 46 in the associated cup-like section 34. The grip 24 also embodies an extension lug 47 having a stud 48 on which is pivotally mounted an actuator-pawl 49 held in engagement with a ratchet 50, Fig. 1, by a suitable spring 51, whereby the relatively stepped ratchets 39, 40, aforesaid, are concurrently rotated a definite degree as hereinafter again referred to, and in accordance with Patent #2,358,622.

All of the foregoing descriptive matter is by way of providing suitable background in explaining the novel features of invention now to be disclosed, and as operatively coordinated with the mechanical items already mentioned. Referring now to the respective head portions 29, 30 of the arcuate jaws 21, 22 and more particularly to Figs. 5 to 14, it is to be firstly noted that the jaw 21 is mainly blanked out or otherwise shaped from appropriate sheet material to channel cross-section; that is to say it embodies an inner wall or web portion 52 appropriately bent to define a transverse or inner bottom section 53 for the head portion 29, with spaced side walls 54, to the opposed upper edges whereof is secured a longer top wall 55 and to the outer edge of which the cover member 25 is hinged at 27. Mounted within the side walls 54, as by rivets 56, and with its web portion firmly seated on the bottom wall section 53, is a channel section 57 embodying inwardly directed co-planar corner abutments 58, having taper holes 59 therethrough for a purpose hereinafter explained. Rigidly secured to the channel section 57 by rivets 60, for example, is an angle-section 61 having the end portions of its vertical flange removed to define a cutter 62, see Fig. 12 to best advantage, with the shearing edge outwardly and downwardly inclined as indicated at 63 relative to the common plane or meeting faces of the head portions 29, 30. Fulcrumed at 64, between the vertical flange portions of the channel-section 57, is a shouldered element 65 including an upper medial section 66 having the free edge beveled at 67 for gripping or snubbing action, as hereinafter set forth, and a lower cut-out 68; while said shouldered element 65 is upwardly-influenced towards the vertical by a leaf-spring 69 rigidly secured to the web portion of the channel section 57 as by spaced rivets 70.

Rigidly attached in the head 29, by rivets 71 for example, and spacedly above the channel section 57, is a shelf 72, such shelf being preferably of channel formation and having a centrally-located semi-circular cut-out 73 in the relatively inner part of its web portion; while supported immediately below said web portion, between the side flanges 74 of the shelf 72, is a slide 75 conveniently sustained by opposed tongues 76 spacedly directed inwards out of said side flanges; whereas the slide 75 is provided with a dependent tongue 77 to one side of the shelf cut-out 73. The shelf 72 is normally constrained to the position shown in Figs. 5–9 and 11, under the action of a leaf-spring 78 secured to the channel section 57 by rivets 79, with its free or upper end engaged in a crotch or fork 80 defined by diverging retainer-stops 81, 82 pressed out of the slide 75, as readily understood by those conversant with the art.

Turning now to the head portion 30 of the movable jaw 22 and more particularly referring to Figs. 5 to 14 it will be observed that said jaw generally resembles the jaw 21 excepting that the jaw 22 is provided in one or both of its opposing flat walls 54 with spaced openings 83 affording access thereinto, see Figs. 1 and 3 to best advantage, for reasons later on herein set forth; whereas the head portion 30 as regards its contour and formation opposingly corresponds with the head portion 29 of the stationary jaw 21 and, conformably thereto like reference characters are applied in order to obviate unnecessary repetitive explanation. It is to be particularly remarked, however, that the movable jaw 22, proximate the inner wall 52, is braced by preferably round section spacers 84, and adjacent the outer curved edge portions of the side walls 54 by similar spacers or tie-rods 85 to rigidify the same, and for purposes later on herein clarified. It is to be further remarked that the spacers 84 and tie-rods 85 are radially separated and that directly intermediate the same are closely arranged medially reduced and plain rollers or rods 86, 87 which jointly guide a flexible pusher or springy strip-impeller 88 approximately central through the movable jaw 22, for a purpose later on set forth; while said impeller 88 is secured at its lower end, as by rivets 89, to an actuator 90 embodying a dogging claw or claws 91 coactive with the stepped ratchet or ratchets 40, such actuator being normally retained in the position shown in Fig. 3 under the action of a recoil spring 92, in accordance with the patent hereinbefore mentioned.

As best appreciated from Figs. 5 to 14, and in accordance with the instant improvements there is secured in the head portion 30, of the movable jaw 22, an inverted channel section, the web portion whereof defines a shelf 93 and the side flanges 94 being secured to the jaw walls 54 by rivets 56 for instance, while said shelf 93 is located in a plane common with the shelf 72 and formed with a semi-circular cut-out 95 opposing the cut-out 73 previously described. In addition the side flanges 94 embody lower inwardly-directed lugs 96 spacedly opposing the corner abutments 58 in the head portion 29, said lugs 96 affording bearing for stud screws 97 having frusto-conical ends 98 located to engage in the taper holes 59 of the abutments 58, whereby the confronting portions 29, 30 are constrained to mating-registration when the jaws 21, 22 move into closed position; whereas the stud screws 97 also enable adjustment being made to accommodate variations in the thickness of the binder medium or strip 42, as later on again referred to herein.

The binder medium or strip 42, as it leaves the supply reel 41, is moved towards the head portion 30 of the movable jaw 22, intermediate the spacers 84 and the inner wall 52 of the latter, by aid of a flexible feeder or strap-like device 99 and associated flanking guides 100. The feeder device 99 is attached at its lower or inner end by rivets or screws 101, for example, to a pusher or actuator 102, embodying a camming claw or claws 103 movable by the ratchet 39, against the inward influence of a recoil spring 104 supported by a stud 105, and having its free end engaging a lug or projections 106 on said device 99; while stationary pins 107 serve to prevent lateral displacement of the actuators 90 and 102 in an obvious manner; and whereby the respective claw portions 91 and 103 are always maintained in coaction with the stepped ratchets 39, 40 as readily understandable on an examination of the drawings.

Referring now more particularly to Fig. 17 it will be seen that the upper or outer end of the feeder device 99 is provided with a shoe portion 108 and a lateral arm or flanking extension 109 to one side thereof, said extension also embodying an arcuate riser 110 paralleling the longitudinal median of the device 99, for a purpose later on herein set forth. Pivoted at 111 between the side walls of the shoe portion 108 is a somewhat obtuse-angled gripper 112, having its forward edge beveled at 113, Fig 8, for impingement on the binder-strip 42 and its rear or heel portion 114 influenced counter-clockwise by a stirrup-shaped recoil spring 115, in turn supported on a bracing-pin 116 intermediate the shoe side-walls.

Turning now to the strip-impeller 88, and referring more particularly to Fig. 18, it will be observed the same at its leading end is of novel formation, in that it includes a relatively outset extension arm 117 which embodies a rectangularly-related vertically-directed cam projection 118; and that it has rigidly attached thereto, as by rivets 119, a shearing element 120, preferably of obtuse-angled cross-section so that the bevel-edged blade portion 121 is forwardly directed for coaction with the opposedly beveled shearing edge 63, of the cutter angle-section 61 hereinbefore mentioned and as hereafter fully clarified.

Mounted on and firmly secured to the respective top walls 55 of the head portions 29, 30 of the jaws 21, 22 are the complemental halves of a T-section inverted socket-device, the bar or flange portions 122 whereof seat on said walls 55, while the leg or socket portions 123 are relatively dependent. It is to be particularly remarked that the respective socket halves 123 normally break joint with the confronting ends of the head portions 29, 30; also it is noteworthy that the inner diameter of said halves corresponds with that of the axially aligned bore defined by the shelf cut-outs 73, 95. The socket halves 123 in turn provide rotary guidance for the complemental halves of a substantially U-section ferrule or sleeve the longer portion 124, Fig. 13, of which abuts below the inner overlap of the socket device flanges 122, whereas the shorter portions 125 engage around the outer face of the socket portions 123; while to the inner ends of such U-section sleeve portions are firmly attached the opposing halves of a mushroom gear 126 rotatively seated on the respective co-planar shelf-components 73, 93 of the jaw head portions 29, 30. It will, accordingly, be readily understood that when the parts 123 and 124 are in assembly they are interengaged; while the socket halves 123 being attached to the respective head walls 55 are stationary, whereas the sleeve halves 124 and gear halves 126, being secured together, are rotatable in unison as hereinafter explained. Vulcanized in, for example only, the bore defined by the inner diameters of the aligned socket flanges 122, sleeve longer portions 124, and the lower body portions 127 of the mushroom gear 126 are complemental semi-plug liner-elements 128 of suitable resilient material which, when the jaws 21, 22 are closed, frictionally abut one another, said parts having their upper ends flared at 129, as clearly shown in Figs. 5 to 11.

In order to rotate the mushroom gear 126 to effect twist-locking of the binder strip 42 use is preferably made of the means now to be explained. Referring first to Figs. 12–16, more particularly the reference character 130 designates a somewhat spool-shaped axis-device, embodying spaced enlargements 131, 132 of different diameters, with the upper 131 for convenience slightly less than the lower 132. The upper end of the axis-device 130 is preferably formed with a non-circular coaxial pad 133 for engagement in a correspondingly shaped hole 134 in the cover member 26, of the movable jaw 22 proximate the head portion 30 with fixture therein, against turning movement, by a clamp-screw 135. Coacting with the enlargements 131, 132, of the axis-device 130, is a stepped-drum the smaller section 136 rotatively fitting the enlargement 131 with the larger section 137 similarly engaging the enlargement 132; while said drum 136, 137 is conveniently counter-clockwise constrained by a spiral spring 138 having its inner end secured at 139 to the axis-device 130 and the outer end anchored at 140 in the wall of the drum section 137, for example, and as readily understood by those conversant with the art. Freely fitting the larger diameter 141 of a stepped extension 142 at the inner or lower end of the axis device 130 is a companion mushroom gear 143 in mesh with the gear 126, above referred to; while said gear 143 is rotatably supported by a bearing washer 144 lockingly clamped on the smaller diameter portion 145, of the stepped extension 142, through the medium of a screw stud 146 in an obvious manner. Operative co-ordination of the stepped drum 136, 137 to the gear 143 is effected through the medium of an annular-ratchet 147, secured concentrically to said gear 143 as by spaced longitudinal prongs 148, engaged through registering holes and appropriately clinched or peened-over at 149. Thus it will be readily seen that by aid of an appropriate pawling dog 150, carried by the drum 136, 137 and under the influence of a suitable restraining leaf-spring 151, said drum, when rotated by actuator means hereafter described, will concurrently turn the gear 143 in a clockwise direction with impartation of reverse rotary motion to the meshing gear 126. On the other hand, when the just mentioned actuator means is released the gears 143 and 126 will be mutually arrested, while the pawling dog 150 will back rack or slide over the teeth of the annular ratchet 147 under the influence of the associated leaf-spring 151.

In order to rotate the mushroom gears 126 and 143 a length of flexible cable 152 has one end secured to the smaller diameter portion 136 of the recoil-influenced drum and clockwise wound thereabout, see Figs. 5 to 10; and from the drum portion 136 the cable 152 is trained over grooved rollers 154 supported by fork-hangers 155 made fast at 156 to the inner surface, and spaced lengthwise of, the hinged cover member 26 of the movable jaw 22; while the other end of said cable is attached to the inner end of a trigger button 157 afforded slidable guidance in a slot 158, in an obvious manner. The curvilinear extent of the slot 158, it is to be particularly noted, equals the semi-circular path of rotation of the mushroom gear 126 so that, for each stroke or pull downwards of the trigger button 157, said gear 126 will have imparted thereto a half-turn, in order that the confronting faces of such gear half-portions may always register with the confronting ends of the jaw head portions 29, 30; whereas on the return stroke of the button 157, under recoil action of the spring 138, the gears 126, 143 will be arrested by the pawling dog 150 and remain at rest or stationary, irrespective of the number of trips imparted to said trigger button 157.

Incidentally, at this juncture it is to be noted that whenever access is desired for replacement of the binder supply-reel 41, when exhausted of its supply of the strip medium 42, all the user has to do is to retract the slidable catches 31, and swing the cover member 26 on its hinge 22 out of the way, remove the empty reel 41 and replace the same, by a new one, and then thread the free end of said medium upwardly along the feeder device 99, under the spacers 84 and between the flanking guides 100, until the leading portion of the binder strip 42 is projected below and engaged by the angled-gripper 112, as shown in Figs. 5-10, and to larger scale by Fig. 17; whereupon the binding implement is ready for use when the cover 26 has again been closed and fastened by the catches 31. It is also observable that due to the gear 143 and associated parts, together with the operating cable 152, grooved rollers 154 and trigger button 157, all being carried by the cover 26, when said cover is opened-out, free access can be had to the interior of the movable arm 22 without encountering any objectionable impedance and with the additional advantage that all of said parts may be assembled and mounted on the cover 26 prior to connection of such cover to the head portion 31 by the simple act of inserting the hinge pin 28, in an obvious manner.

Having described the structure of the improved binding implement of this invention, the use and operation thereof will now be explained, it being assumed the arcuate jaws 21, 22 are closed as shown in Figs. 1 and 3, more particularly. Assuming also that the various parts and mechanism occupy the positions shown to best advantage in Figs. 3 and 5, the user of the implement initially—if not already so done for a reason later on explained—draws the finger-grip 24 into abutment with the extension grasp 23 of the stationary jaw 21 with incidental forward projection of the strip feeder-device 99 by the ratchet 39 and camming claw 103. In other words the movement of the feeder device 99 just mentioned, transfers the shoe portion 108 thereof from the position shown in Fig. 5 to that of Fig. 6, with incidental projection of the leading end of the binder strip 42 into contact with the underside of the slide 75 and passage over the medial section 66 of the fulcrumed element 65, the latter being concurrently rocked on its fulcrum points 64 to the left-hand, or further over from the vertical, by impact of the tip of the feeder arcuate riser 110 with said element 65, in opposition to the normal influence of the leaf-spring 69. As a result, it will be noted that the leading end of the binder-strip 42 is flexed over the beveled edge 67 of the section 66 and, under the recoil influence of the leaf-spring 69, becomes arrestively gripped below the slide 75, as shown in Fig. 7. When the finger grip 24 is released, the spring 43 reacts with temporary release of the camming claw 103 from operating engagement against the ratchet or ratchets 39 whereupon the recoil spring 104 functions to snap the actuator 102 back to its normal position and thereby hold the jaws 21, 22 closed. Now it will be readily seen that the user of the implement must draw the finger grip 24 into engagement with the grasp extension 23 in order to open the jaws 21, 22 from the position of Fig. 7 to that of Fig. 8, it being remarked that an initial length of the binder strip 42, previously drawn from the spool 41, is held taut between the jaw head portions 29, 30 due to its leading end being gripped by the fulcrumed element 65 against the slide 75 and the joint action of the spring 104 above explained, all as understandable from a study of Figs. 7 and 8. Upon opening the jaws 21, 22 as aforesaid, the user of the implement, manually draws out a loop 159 of the binder strip 42 sufficient to surround an article or bundle 160, as graphically indicated by dot-and-dash lines in Fig. 8, and thereupon releases said loop for contraction about the article or bundle 160, or into the encircling position shown in Fig. 9 upon release of the finger grip 24 to again close the arcuate jaws 21, 22. Concurrent with the just mentioned reclosing of the jaws 21, 22, the strip impeller 88 is racked forward, by the ratchet 40 and associated actuator-claw 91, with passage of the cam projection 118 at its leading end under the shelf portions 93 and 73 of the head portions 30, 29 of the respective jaws 21, 20. Incidental to depression of the leading portion of the impeller 88 by the cam projection 118, it is to be particularly observed that the shearing element 120 is moved into cutting relation with respect to the active edge 63 of the angle-section cutter 62 in the stationary jaw head portion 29, with separation of the length of binder-strip 42 about the article or bundle 160 from the feed supply, as clearly understandable from Fig. 10. It is further to be noted that, as the cutting of the binder-strip 42 takes place, the leading end of the impeller flanking extension-arm 117 impacts the dependent tongue 77 of the slide 75 and forces it rearwards or to the left-hand, see Fig. 10, with incidental release of the shouldered element 65 from arrestive coaction with the initially gripped end of the binder-strip 42. As a result both of the freed ends of the binder-strip 42 encircling the article or bundle 160, being firmly held between the semi-plug elements 128 in the outer confronting ends of head portions 29, 30, said free ends below the elements 128 will variably recoil somewhat into the plane of the meeting faces of said head portions, or towards the longitudinal median of the implement as shown in Fig. 10; while the impeller 88 will be automatically retracted to its normal position under the recoil action of the associated spring or springs 92, in an obvious manner.

The user of the implement now by a simple movement with one finger draws the trigger button 157 from the full line showing in Fig. 2 to the dotted line position, or inwardly of the movement limiting slot 158, which through pull on the flexible cable 152 effects a half-revolution of the mushroom gear 143, and complemental semi-rotation of the meshing gear 126, whereby a corresponding turn is given to the drum 136, 137 and a half twist imparted to the abutting free ends of the binder-strip 42. Now it will be readily understood, by those conversant with the art, that by two or more similar snap movements being given the trigger button 157 that the free ends of the binder-strip 42 can be progressively twist-locked to any desirable extent, as typically indicated at 161 in Fig. 11, above the flare 129 of the semi-plug elements 128, such twist-locking being expedited by the frictional grip of the elements 128 which also conduces, as such twist-locking increases, to draw the terminal-end portions of binder-strip 42 into closer registration. The bound article or bundle 160 is now ready for release from the improved implement either by slight pressure exerted on the finger-grip 24 and withdrawal of the twist-locked ends from engagement between the head portions 29, 30 in an obvious manner; or by drawing the finger grip 24 into abutment with the extension grasp 23 of the stationary jaw 21, as hereinbefore set forth, ready for the pulling out of another loop 159 in readiness for insertion of the next article or bundle 160 to be bound, whereby the binding operation may be carried on continuously or until the supply reel 41 is exhausted of binder-strip 42.

From the foregoing, it is thought the merits and advantages of my improved binding implement will be self-evident to those conversant with such instrumentalities; but it is desired to herein emphasize the inherent simplicity of its construction and operation; while practically all of the parts are producible from appropriate sheet material on a production basis, and readily assembled with a minimum expenditure of time and labor. In addition the respective mechanism for feeding and applying the binder-strip 42 to an article or bundle 160; for severing the applied strip 42 from the supply; and for effecting the "twist-locking" of the ends of said applied strip; are all positive in action and, hence, unlikely to get out of order; whereas ready accessibility is provided for making adjustments or replenishment of the supply of binder-strip 42 respectively whenever desirable or necessary.

Furthermore, it is to be expressly understood that while I have shown and described a binding implement well adapted for handling conventional species of binder-strip material, said implement is equally well adapted for using thin or flattened wire, binder strip materials with a fine wire embedded medially lengthwise thereof, composite types of strip of part metal, textile, paper, Cellophane, and chemically treated ductile type binders, all of which are capable of being twist-locked without recoil under external or internal force exerted by the article or bundle bound thereby. Again it is stressed that by releasing the initially gripped end of the binder-strip 42 from engagement by the fulcrumed element 65 concurrently with severance of the applied strip 42 from supply, and firm grippage of the adjoining portions of such strip proximate the article or bundle 160, the twist-lock 161 is readily effected without any possibility of the relatively free ends of the applied strip fouling or snagging other parts during rotation thereof, due to the provision of adequate clearance below the gears 126 and 143. Still further it is to be particularly noted that by precision fabrication of the gear 126 in complemental halves, the gear 143 can only rotatively turn said gear 126 by compacted association incidental to the gear 143 being constrained or limited, on each actuation of the trigger button 157, to a half-turn by the movement limiting slot 158.

Finally while one practical embodiment of this invention has been described more or less in detail, it is obvious that changes and improvements will suggest themselves in adapting said invention to other than the herein described form, but it is to be understood that all such changes and improvements are contemplated as reasonably falling within the scope of the following claims and the state of the prior art permits.

Having thus described my invention, I claim:

1. In a binding implement comprising opposed interpivoted hollow-jaws and means supplying a binder-medium; means for feeding the binder-medium through one of the jaws to the head portion thereof; means in the other jaw head portion for arrestively gripping the leading end of the binder-medium when projected thereinto; means alternately operative to enable application of a length of the binder-medium about an article or bundle and to sever the applied portion, from supply, concurrently with release of the previously gripped leading end; and independently actuable means effective to impart consecutive unidirectional half-turns to the terminal portions of the applied binder-medium whereby said terminal portions are positively twist-locked together.

2. The invention of claim 1, wherein the feeding means for the binder-medium, the means for arrestively gripping the leading end of said medium and for releasing said means, as well as the twist-locking means, are all located within the hollow jaws.

3. The invention of claim 1 wherein the twist-locking means comprises recoil-influenced cooperative elements in the respective head portions of the jaws; wherein said elements are adapted for mating registration in the meeting plane of jaw closure; and wherein the actuator means for effecting the twist-locking is carried by a hinged cover on one of the hollow jaws.

4. The invention of claim 1 wherein the twist-locking means comprises opposed recoil-influenced pivotal elements, each said element having an associated half-gear; wherein said elements and half-gears are opposingly journaled in the respective head portions of the hollow jaws; and wherein a recoil-influenced meshing gear with movement-limiting actuator-means is mounted in and operative through one of said jaws.

5. A binding implement comprising complementally-curved interpivoted hollow-jaws, one of which is movable relative to the other; means for influencing the movable jaw into closed position; mechanism operative to pivotally move one of the jaws relatively away from the other jaw; means supplying binder medium about the pivot of the jaws, and an associated feeder device including a gripper effective to hold the leading end of said medium projected therebeyond within the head portion of one jaw; an oppositely effective gripper in the head portion of the other jaw; means at the forward end of the feeder-device effective to move the second mentioned gripper forwards, upon primal opening of the jaws by the mechanism aforesaid, with concurrent advancement of the feeder-device and projection of the leading end of the binder medium over said second mentioned gripper for arrestive detention thereby, on recoil of the feeder to normal position during return of the movable jaw to closed position; means enabling, upon a second opening of the hollow-jaws, withdrawal of a length of the binder-medium sufficient to surround an article or bundle and, upon rebound of said jaws, to draw said withdrawn medium compactly around said article or bundle with the relatively terminal portions thereof frictionally gripped between the jaw head confronting ends; an impeller with means for guiding it through the first mentioned jaw; a cutter at the leading end of the impeller and means whereby said impeller is advanced and the cutter depressed into binder-medium severing coaction with a stationary cutter in the opposing jaw head, with concurrent release of the initially gripped-end of said medium, when said impeller is advanced upon a further opening of the implement jaws and returns to closed position under rebound action as aforesaid; and means in the respective jaw head-portions, with an associated movement restricting actuator, jointly effective to impart consecutive half-turns to the relatively terminal portions of the binder-medium, encircling the article or bundle, whereby said binder-medium is securely twist-locked against accidental release.

6. A binding implement comprising relatively stationary and movable interpivoted hollow-jaws, one of which is movable relative to the other; means influencing the movable jaw into closed position; mechanism operative to turn the movable jaw into open position; means supplying binder-medium about the pivotal connection of the jaws, an associated feeder-device including a gripper effective to hold the leading end of said binder-medium projected therebeyond within the head portion of the movable jaw; a pressure-influenced oppositely effective pivotal grip-element in the head portion of the stationary jaw; means at the forward end of the feeder-device engageable with the grip-element to move the latter on its pivot away from its normal position, upon primal opening of the implement jaws by actuation of the mechanism aforesaid, with concurrent advancement of the feeder-device and projection of the leading end of the binder-medium over said grip-element for arrestation thereby, on recoil of the feeder-device to normal location and rebound closure of the movable jaw; means effective upon reopening of the jaws to permit manual withdrawal of a loop of the binder-medium sufficient to surround an article or bundle and to draw said loop taut about the article or bundle, with the terminal portions thereof frictionally held between the jaw head confronting ends during reclosure of the said implement jaws; a flexible impeller with means for guiding it medially lengthwise through the movable jaw; a dependent cutter at the leading end of the impeller and associated means whereby said impeller is respectively advanced and the cutter depressed into binder-medium severing coaction with a stationary cutter in the head portion of the stationary jaw, and with concurrent release of the initially-gripped end of said medium, when said impeller is advanced upon a further opening of the implement jaws and prior to their return to closed position under rebound action as aforesaid; recoil-influenced pivotal means in the respective jaw head-portions jointly effective to impart half-turns to the terminal portions of the binder-medium intermediate said head-portions and the article or bundle; and means operative to impart consecutive semi-rotative motions to the recoil-influenced pivotal means, whereby the binder medium around the article or bundle is positively twist-locked against any recoil action.

7. A binding implement comprising relatively stationary and movable oppositely-curved interpivoted hollow-jaws, one of which is movable relative to the other; means influencing the movable jaw into closed position; mechanism operative to turn the movable jaw into open position; a reel supplying binder-strip, about the pivotal connection of the jaws, and an associated feeder-device including gripper-means effective to hold the leading end of said binder-strip projected therebeyond within the head portion of the movable jaw; a pressure-influenced oppositely effective pivotal grip-element in the head portion of the stationary jaw; a pressure-influenced slide effective to limit inward movement of the grip element with associated means effective to normally hold said slide inwardly located; means at the forward end of the feeder-device engageable with the grip-element to move the latter on its pivot away from engagement with the slide aforesaid, upon primal opening of the implement jaws, with concurrent advancement of the feeder-device and projection of the leading end of the binder-strip over said grip-element for arrestation thereby, on recoil of the feeder-device and rebound closure of the movable jaw; means effective upon reopening of the jaws to permit manual withdrawal of a loop of the binder-strip sufficient to surround an article or bundle and to draw said loop taut about such article or bundle, with the terminal portions thereof frictionally held between the jaw head confronting ends during reclosure of said jaws; a flexible impeller and means for guiding it medially lengthwise through the movable jaw; a dependent cutter at the leading end of the impeller having a projection and an extension; means whereby the impeller is respectively advanced and the cutter depressed by said projection into binder-strip severing coaction with a stationary cutter in the head portion of the stationary jaw, with concurrent release of the initially-gripped end of said strip by impact of the impeller extension against the pressure-influenced slide aforesaid, when the impeller is advanced upon a further opening of the implement jaws and prior to their return to closed position under rebound action; recoil-influenced pivotal-elements in the respective jaw head-portions jointly effective to impart half-turns to the terminal portions of the binder-strip intermediate said head-portions and the article or bundle; and means operative to impart consecutive semi-rotative motions to the recoil-influenced pivotal-elements, whereby the binder-strip around the article or bundle is positively twist-locked against any recoil action.

8. The invention of claim 7 wherein the means operative to advance the flexible impeller to effect severance of the binderstrip, applied about the article or bundle, from the supply thereof during the terminal opening of the implement jaws, jointly cooperates with the strip feeder-device to project the leading end of the binder strip into position for snap engagement by the pivotal grip-element during the rebound closure of the implement jaws, whereby the binding implement can be continuously used, until the supply of binder-strip therein becomes exhausted, without recourse to a primal opening operation until a fresh supply of strip is placed therein.

9. A binding implement in accordance with claim 7 wherein the stationary and movable hollow jaws are of opposing arcuate formation and mainly of channel-section with the spaced walls directed outwards, and the relatively confronting end web-portions shaped to define short walls which meet in a common plane; wherein outwardly swingable cover members are fulcrumed to the head portions of the respective hollow jaws and serve to close in the major extent of the outwardly directed spaced side walls; wherein appropriate slidable catches normally retain the cover members in closed position; and wherein circumferentially-spaced openings are provided in the opposed side walls of the movable jaw.

10. A binding implement in accordance with claim 7 wherein the head portion of one of the jaws embodies inwardly-directed co-planar corner abutments having taper-holes therethrough; wherein the head portion of the other jaw includes inwardly-directed lugs, spacedly-opposing the corner abutments aforesaid; and wherein such inwardly-directed lugs afford bearing for stud-screws having shank-end portions adapted for entry into the taper-holes of the corner abutments, whereby the jaw head confronting end portions are constrained to mating registration when closed, and whereby said stud-screws may be adjusted to variably control the relative closure plane of said end portions.

11. A binding implement in accordance with claim 7 wherein the cutter in the head portion of the stationary jaw consists of a laterally disposed angle-section element with the shearing-portion approximately vertical and the active edge whereof is outwardly and downwardly inclined relative to the common meeting plane of the implement head portions when the jaws are closed.

12. A binding implement in accordance with claim 7 wherein the gripper-means effective to initially hold the binder-medium projected beyond the forward feeder-device comprises a pivotally-mounted obtuse-angled gripper having its active edge beveled for impingement on said medium, and wherein a recoil-spring serves to influence said pivotal-gripper in the active direction.

13. A binding implement in accordance with claim 7 wherein the pivotal grip-element in the head of the stationary-jaw is in the form of a shouldered element including a medial section having its free edge beveled for snubbing action, and an opposingly located cut-out wtih alignedly related corner pivots; wherein a super-jacent slide is provided, against which the beveled edge of the shouldered element is influenced to impinge the leading end of the binder-medium; and wherein spring-means coact with the slide to normally hold the latter stationary with the binder-medium leading and bent over and arrestively detained by the shouldered element bevel-edged medial section.

14. A binding implement in accordance with claim 7 wherein the pressure-influenced slide is provided with a dependent crotch defined by lateraly spaced diverging retainer-stops on said slide; wherein a fixed leaf-spring has its free end engaged in the dependent crotch of said slide; and wherein a dependent tongue on the slide is forcibly movable in opposition to the leaf-spring.

15. A binding implement in accordance with claim 7 wherein the binder-strip feeder consists of a flexible-element trained along the inner-wall of the movable-jaw intermediate the side walls of the latter; wherein means guide and maintain said element centrally in movable contact relative to the inner-wall; wherein the flexible-element includes a lateral projection and an arcuate riser at the forward end and said riser parallels the longitudinal median of the feeder; wherein a channel-shaped shoe is provided adjacent the forward end of the flexible-element; wherein an inverted angle-section gripper is pivoted in the shoe portion and has the relatively forward flange edge beveled for snubbing action; and wherein a recoil-spring coacts with the rear flange of said gripper to influence the same counter-clockwise.

16. A binding implement in accordance with claim 7 wherein the flexible impeller is in the form of a springy-material strip; wherein circumferentially spaced medially-reduced rollers arcuately guide said strip centrally lengthwise through the movable jaws; wherein an outset extension, to one side of the leading portion of the impeller, embodies a relatively vertical cam projection; wherein an angle-section cutter is secured to the leading end of the impeller, and wherein said cutter has its shearing edge forwardly directed.

17. A binding implement in accordance with claim 7 wherein the recoil-influenced pivotal-elements comprise opposed stationary socket-halves which co-planarly register with the confronting ends of the head portions of the inter-pivoted hollow-jaws; wherein complemental opposing half-gears rotatively coact with the socket-halves and similarly register therewith; wherein a recoil-influenced gear meshes the half-gears; and wherein means operatively constrain the recoil-influenced gear to semi-rotative motion, whereby the half-gears are conjointly rotated by consecutive half-turns in one direction only.

18. A binding implement in accordance with claim 7 wherein the recoil-influenced pivotal-elements comprise opposed semi-tubular stationary T-sections jointly defining an inverted socket device, and said sections co-planarly register with the meeting ends of the jaw head portions when closed; wherein complemental substantially U-section sleeve-halves rotatively engage the socket device interiorly and exteriorly; wherein opposed halves of a mushroom gear are firmly secured to the bottom portions of said sleeve-halves; wherein said sleeve-halves and mushroom gear-halves both register with the socket device; wherein said mushroom gear-halves are rotatively supported by co-planar fixed shelf-elements in the confronting head-portions of the hollow-jaws; wherein all of the parts aforesaid jointly define a common central bore; and wherein semi-plug elements of resilient material are opposingly secured in said central bore with their meeting faces in the plane of jaw closure.

19. A binding implement in accordance with claim 7 wherein the means operative to impart consecutive semi-rotative motions to the pivotal-elements comprises an axis-device embodying spaced portions of different diameters, and means whereby said device is rigidly mounted; wherein a recoil-influenced stepped-drum is rotatively mounted on the axis device, with supporting means for said drum; wherein a mushroom-gear and associated annular-ratchet are attached to the stepped-drum; wherein a flexible cable is attached at one end to, and is coiled around, the stepped-drum for impartation of turning movement to the latter; wherein said cable is trained over suitable guide means and has its free end attached to a trigger button; and wherein said trigger button is accorded recoil movement in a guide slot, said slot having an extent equal to the semi-circular path of rotation of the pivotal-elements.

JOSEPH R. BURNS.

REFERENCES CITED

The following references are of record in the file of this patent:

UNITED STATES PATENTS

| Number | Name | Date |
| --- | --- | --- |
| 669,351 | Burns | Mar. 5, 1901 |
| 2,358,622 | Schindel | Sept. 19, 1944 |